US012181818B2

(12) United States Patent
Maruyama et al.

(10) Patent No.: US 12,181,818 B2
(45) Date of Patent: Dec. 31, 2024

(54) IMAGE FORMING APPARATUS

(71) Applicant: BROTHER KOGYO KABUSHIKI KAISHA, Nagoya (JP)

(72) Inventors: Yasuhiro Maruyama, Nagoya (JP); Yuta Uchiyama, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 123 days.

(21) Appl. No.: 17/932,022

(22) Filed: Sep. 14, 2022

(65) Prior Publication Data

US 2023/0101317 A1 Mar. 30, 2023

(30) Foreign Application Priority Data

Sep. 24, 2021 (JP) ................................. 2021-155442

(51) Int. Cl.
*G03G 15/20* (2006.01)

(52) U.S. Cl.
CPC ................................ *G03G 15/2039* (2013.01)

(58) Field of Classification Search
CPC .................................................. G03G 15/2039
See application file for complete search history.

(56) References Cited

U.S. PATENT DOCUMENTS

2013/0202324 A1 8/2013 Takeuchi et al.
2017/0031280 A1 2/2017 Kondo
2017/0090398 A1 * 3/2017 Kato ...................... G03G 15/80
2017/0363997 A1 12/2017 Kamo et al.

FOREIGN PATENT DOCUMENTS

JP 2013-160980 A 8/2013
JP 2017-32771 A 2/2017
JP 2017-215509 A 12/2017
JP 2017-223862 A 12/2017

* cited by examiner

*Primary Examiner* — Stephanie E Bloss
*Assistant Examiner* — Michael A Harrison
(74) *Attorney, Agent, or Firm* — Merchant & Gould P.C.

(57) ABSTRACT

Selecting one conveyance mode from a plurality of conveyance modes includes a first selection process of selecting the one conveyance mode based on a detection temperature of a temperature sensor from a first time point at which rotation of a fixing rotator is started to a second time point at which a particular period elapses from the first time point. The first selection process includes: determining whether an initial temperature is higher than or equal to a first temperature, the initial temperature being a detection temperature of the temperature sensor when a print instruction is received; in response to determining that the initial temperature is lower than the first temperature, setting the particular period to a first period; and in response to determining that the initial temperature is higher than or equal to the first temperature, setting the particular period to a second period longer than the first period.

13 Claims, 6 Drawing Sheets

| INITIAL TEMPERATURE | PARTICULAR PERIOD |
|---|---|
| Hb<H1 | T1 |
| Hb≥H1 | T2(T2>T1) |

| OUTSIDE AIR TEMPERATURE | INITIAL TEMPERATURE | TEMPERATURE GRADIENT | CONVEYANCE MODE |
|---|---|---|---|
| Ho≥Ho2 | Hb≥H2 | – | FIRST CONVEYANCE MODE |
| | Hb<H2 | G≥G2 | SECOND CONVEYANCE MODE |
| | | G1≤G<G2 | THIRD CONVEYANCE MODE |
| | | G<G1 | FOURTH CONVEYANCE MODE |
| Ho1≤Ho<Ho2 | Hb≥H2 | – | THIRD CONVEYANCE MODE |
| | Hb<H2 | G≥G3 | |
| | | G<G3 | FOURTH CONVEYANCE MODE |
| Ho<Ho1 | – | – | |

IMAGE FORMING APPARATUS

REFERENCE TO RELATED APPLICATIONS

This application claims priority from Japanese Patent Application No. 2021-155442 filed on Sep. 24, 2021. The entire content of the priority application is incorporated herein by reference.

BACKGROUND ART

Conventionally, an image forming apparatus including a fuser is known.

DESCRIPTION

It is considered that a controller of an image forming apparatus selects a conveyance mode based on a temperature rise gradient at a fixing nip (hereinafter, also referred to as "temperature gradient"). Specifically, upon receiving a print instruction, the controller starts energizing a heater with a pressure roller stopped, and starts rotating the pressure roller after a predetermined stop heating period elapses. After that, the controller selects the conveyance mode based on the temperature gradient at the fixing nip from the start of rotation of the pressure roller until an elapse of a predetermined mode determination period.

However, if the mode determination period is a fixed value, an appropriate conveyance mode may not be selected depending on the temperature at the fixing nip when a print instruction is received.

In view of the foregoing, an example of an object of this disclosure is to provide an image forming apparatus configured to appropriately select a conveyance mode.

According to one aspect, this specification discloses an image forming apparatus. The image forming apparatus includes a sheet tray, a print engine, a conveyor, a fuser, a temperature sensor, and a controller. The sheet tray is configured to accommodate a sheet. The print engine is configured to form a toner image on the sheet. The conveyor is configured to convey the sheet from the sheet tray toward the print engine. The fuser is configured to fix the toner image on the sheet. The fuser includes a fixing rotator and a heater configured to heat the fixing rotator. The temperature sensor is configured to detect a temperature of the fuser. The controller is configured to perform: starting heating of the fixing rotator by the heater; starting rotation of the fixing rotator; selecting one conveyance mode from a plurality of conveyance modes. The plurality of conveyance modes has different timings to start conveyance of the sheet by the conveyor. The selecting one conveyance mode includes a first selection process of selecting the one conveyance mode based on a detection temperature of the temperature sensor from a first time point at which the rotation of the fixing rotator is started to a second time point at which a particular period elapses from the first time point. The first selection process includes: determining whether an initial temperature is higher than or equal to a first temperature, the initial temperature being a detection temperature of the temperature sensor when a print instruction is received; in response to determining that the initial temperature is lower than the first temperature, setting the particular period to a first period; and in response to determining that the initial temperature is higher than or equal to the first temperature, setting the particular period to a second period longer than the first period.

Next, an embodiment of this disclosure will be described in detail with reference to the drawings as appropriate.

Figure 1:
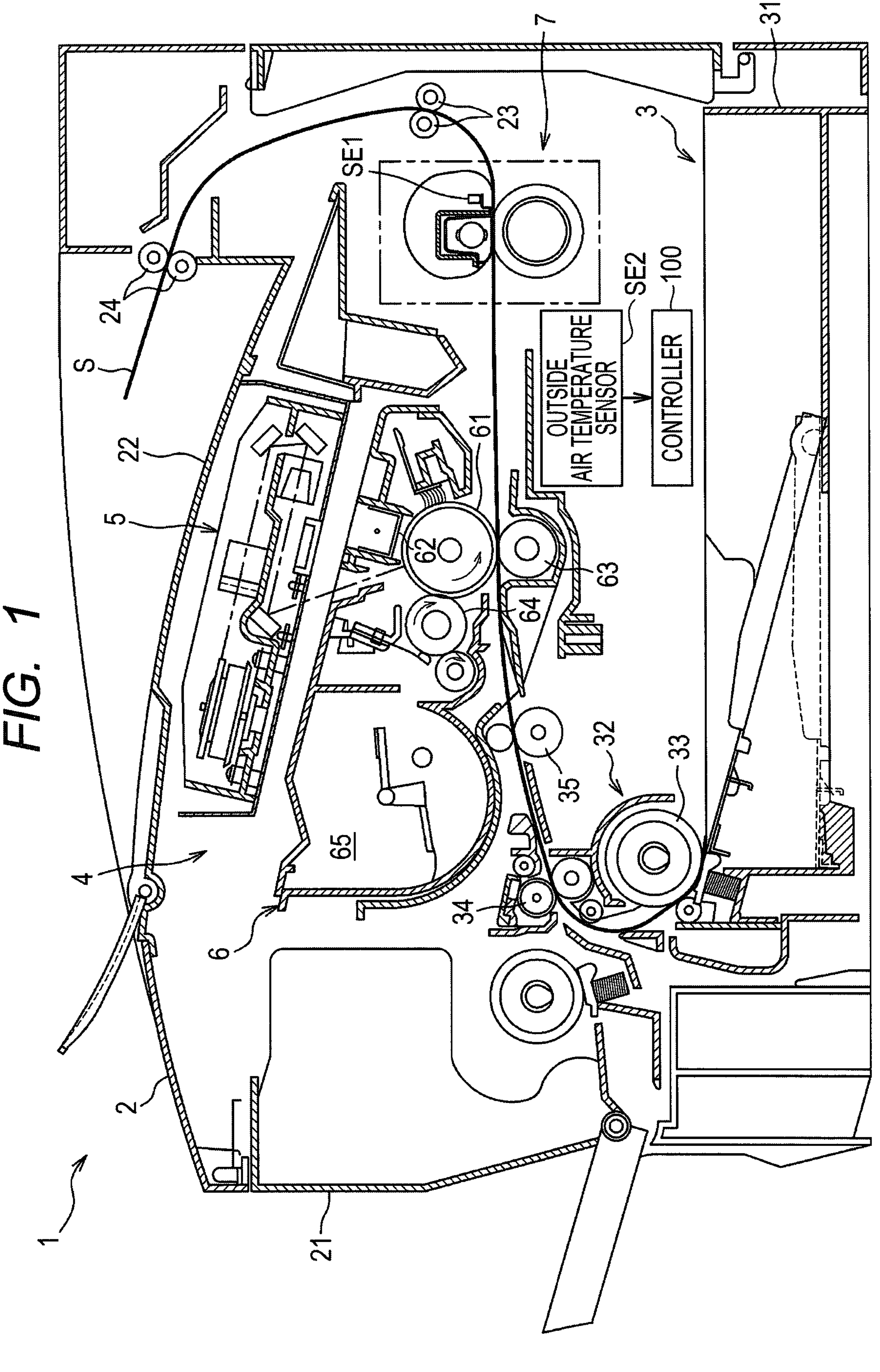
FIG. 1 is a cross-sectional view showing a laser printer.

As shown in FIG. 1, a laser printer 1 as an example of an image forming apparatus includes a main housing 2, a supply unit 3 configured to supply a sheet S, an image forming unit (print engine) 4 configured to form a toner image on the sheet S, and a fuser 7 configured to fix the image to the sheet S.

The supply unit 3 includes an accommodating portion (sheet tray) 31 configured to accommodate the sheet S and a conveyor 32 configured to convey the sheet S from the accommodating portion 31 toward the image forming unit 4. The conveyor 32 includes a pickup roller 33, a conveyance roller 34, and a registration roller 35. The sheet S in the accommodating portion 31 is picked up by the pickup roller 33 and then supplied to the image forming unit 4 via the conveyance roller 34 and the registration roller 35.

The image forming unit 4 includes an exposure unit 5 and a process cartridge 6. The exposure unit 5 includes a laser light emitting portion (not shown), a polygon mirror, lenses, reflecting mirrors, and so on, which are shown without reference numerals. The exposure unit 5 exposes the surface of a photosensitive drum 61 with the laser light emitted from the laser light emitting portion.

The process cartridge 6 is attachable to and detachable from the main housing 2 through an opening formed when a front cover 21 provided in the main housing 2 is opened. The process cartridge 6 includes the photosensitive drum 61, a charger 62, a transfer roller 63, a development roller 64, and a toner accommodating portion 65.

In the process cartridge 6, the surface of the photosensitive drum 61 is charged by the charger 62 and then exposed to light by the exposure unit 5, such that an electrostatic latent image is formed on the photosensitive drum 61. The toner in the toner accommodating portion 65 is supplied to the electrostatic latent image on the photosensitive drum 61 by the development roller 64.

With this operation, a toner image is formed on the photosensitive drum 61. After that, when the sheet S is conveyed between the photosensitive drum 61 and the transfer roller 63, the toner image on the photosensitive drum 61 is transferred onto the sheet S.

The toner image transferred onto the sheet S is fixed on the sheet S by passing through the fuser 7. The sheet S on which the toner image is fixed is discharged onto a discharge tray 22 by conveyance rollers 23 and 24.

Figures 2, 3:
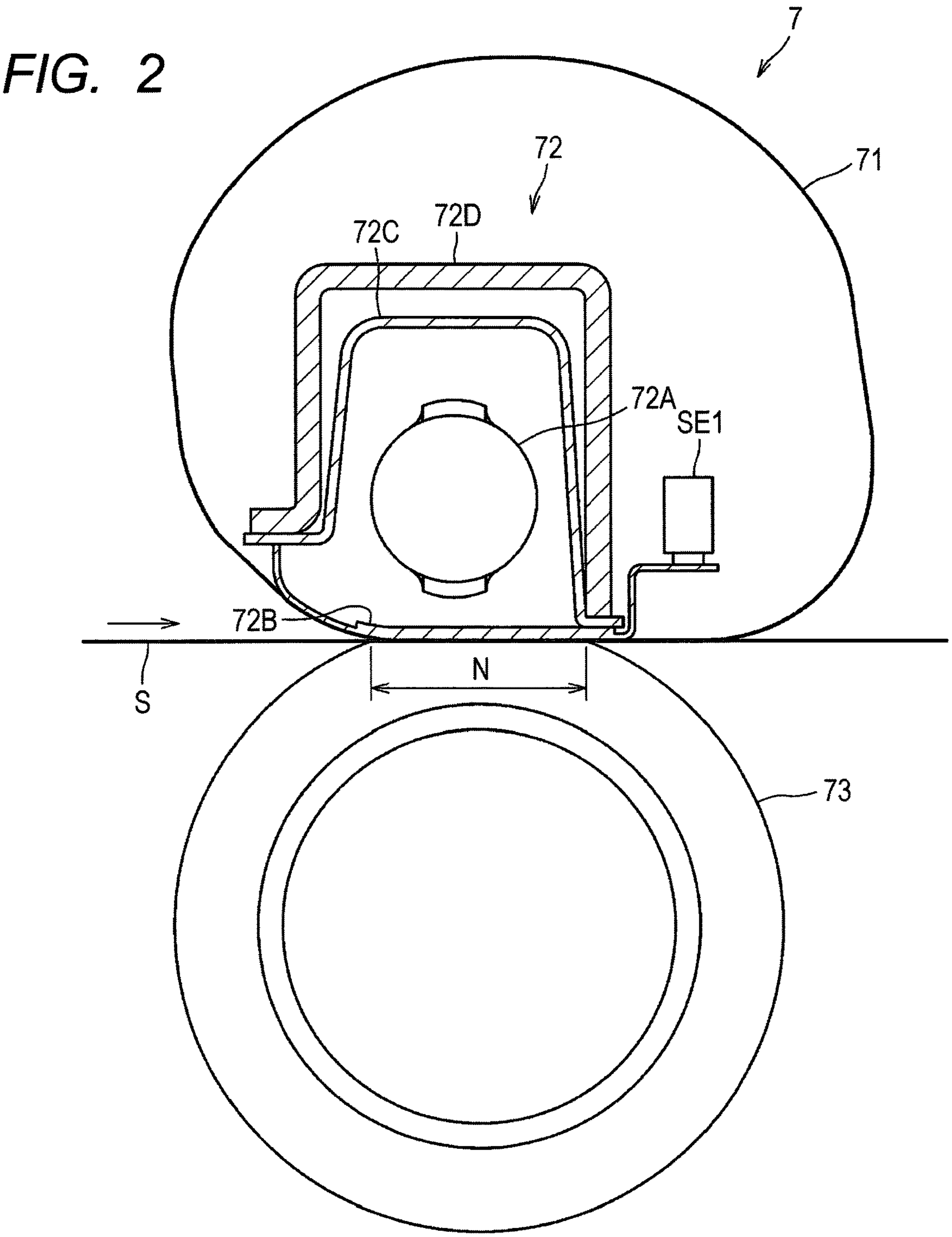
FIG. 2 is a cross-sectional view showing a fuser.
FIG. 3 is a table for determining a particular period based on an initial temperature.

As shown in FIG. 2, the fuser 7 includes a fixing belt 71 as an example of a fixing rotator, a heating unit 72 configured to heat the fixing belt 71, a pressure roller 73 configured to sandwich the fixing belt 71 with the heating unit 72, and a temperature sensor SE1.

The fixing belt 71 is an endless belt. The heating unit 72 is arranged inside the fixing belt 71.

The heating unit 72 includes a heater 72A, a nip plate 72B, a reflective member 72C, and a stay 72D.

The heater 72A is a heater that generates heat, specifically, radiant heat to heat the nip plate 72B and the fixing belt 71, by energization. As the heater 72A, for example, a halogen lamp may be adopted. The nip plate 72B is a plate-shaped member that receives radiant heat from the heater 72A. The nip plate 72B sandwiches the fixing belt 71 with the pressure roller 73.

The reflective member 72C is a member that reflects the radiant heat from the heater 72A toward the nip plate 72B. The stay 72D supports the nip plate 72B via the reflective member 72C.

The pressure roller 73 sandwiches the fixing belt 71 with the heating unit 72, thereby forming a nip portion N with the fixing belt 71. The heating unit 72 and the pressure roller 73 are configured such that one of them is urged toward the other such that the heating unit 72 and the pressure roller 73 are in pressure contact with each other.

The pressure roller 73 is configured to be rotationally driven by transmission of a driving force from a motor (not shown) provided in the main housing 2. When the pressure roller 73 rotates, the fixing belt 71 is rotated by following the rotation of the pressure roller 73.

The temperature sensor SE1 is a sensor that detects the temperature of the fuser 7.

Specifically, the temperature sensor SE1 is attached to the nip plate 72B. The temperature sensor SE1 detects the temperature of the nip portion N by detecting the temperature of the nip plate 72B.

Returning to FIG. 1, the laser printer 1 further includes an outside air temperature sensor SE2 and a controller 100. The outside air temperature sensor SE2 is a sensor that detects the temperature outside the main housing 2.

The controller 100 includes a CPU, a ROM, a RAM, and so on, and is configured to execute various processes in response to reception of a print instruction and so on in accordance with a program prepared in advance. The controller 100 is configured to execute a selection process for selecting one conveyance mode from a plurality of conveyance modes having different timings at which conveyance of the sheet S by the conveyor 32 is started.

In the present embodiment, the plurality of conveyance modes includes a first conveyance mode, a second conveyance mode, a third conveyance mode, and a fourth conveyance mode.

The first conveyance mode is a mode in which the timing to start conveyance of sheet S is the earliest. When executing the first conveyance mode, the controller 100 starts conveyance of the sheet S immediately upon receiving a print instruction. That is, in the first conveyance mode, upon receiving the print instruction, the controller 100 starts the rotation of the pressure roller 73, and then starts conveyance of the sheet S by the conveyor 32 without waiting for an elapse of a particular period T described later. Since the fixing belt 71 starts rotation due to start of rotation of the pressure roller 73, "rotation start of the pressure roller 73" has the same meaning as "rotation start of the fixing belt 71".

The second conveyance mode is a mode in which the timing of starting the conveyance of sheet S is later than that of the first conveyance mode. When executing the second conveyance mode, the controller 100 starts the conveyance of the sheet S before the temperature of the fuser 7 reaches a fixing target temperature suitable for fixing.

The third conveyance mode is a mode in which the timing of starting the conveyance of sheet S is later than that of the second conveyance mode. When executing the third conveyance mode, the controller 100 starts the conveyance of the sheet S at the time when the temperature of the fuser 7 reaches the fixing target temperature suitable for fixing.

The fourth conveyance mode is a mode in which the conveyance speed of the sheet S is slower than that of the other conveyance modes. The timing of starting the conveyance of the sheet S is the same as that of the third conveyance mode.

In a selection process, the controller 100 is configured to execute a first selection process and a second selection process.

The first selection process is a process in which one conveyance mode is selected based on a detection temperature H of the temperature sensor SE1 from when the rotation of the pressure roller 73 is started after start of the heating by the heater 72A until when the particular period T elapses. Specifically, in the first selection process, the controller 100 calculates a temperature gradient G that rises during the particular period T based on the detection temperature H, and selects one conveyance mode based on the calculated temperature gradient G.

The temperature gradient G may be a temperature difference between the detection temperature H at the time of start of rotation of the pressure roller 73 and the highest temperature of the detection temperature H during the particular period T. Alternatively, the temperature gradient G may be a temperature difference between the lowest temperature and the highest temperature of the detection temperature H during the particular period T.

The controller 100 has a function of, in the first selection process, setting the particular period T based on an initial temperature Hb, which is the detection temperature H of the temperature sensor SE1 when the print instruction is received. Specifically, as shown in FIG. 3, in the first selection process, the controller 100 determines whether the initial temperature Hb is higher than or equal to a first temperature H1. When the initial temperature Hb is lower than the first temperature H1, the controller 100 sets the particular period T to a first period T1. When the initial temperature Hb is higher than or equal to the first temperature H1, the controller 100 sets the particular period T to a second period T2 which is longer than the first period T1.

The second selection process is a process of selecting one conveyance mode based on at least an outside air temperature Ho (that is, based on the outside air temperature Ho, or based on both the outside air temperature Ho and the initial temperature Hb), without calculating the temperature gradient G.

Figures 4, 5:
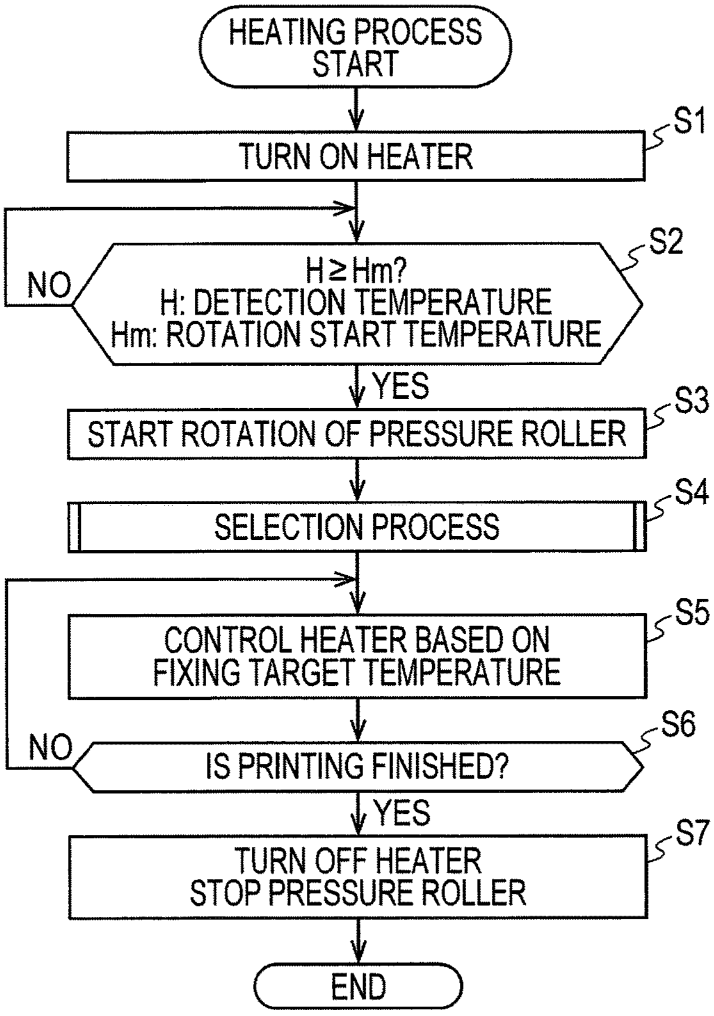
FIG. 4 is a table showing a relationship between outside air temperatures, initial temperatures, and temperature gradients and conveyance modes.
FIG. 5 is a flowchart showing a heating process.

Specifically, as shown in the table shown in FIG. 4, the controller 100 selects one conveyance mode from a plurality of conveyance modes. First, each threshold value in FIG. 4 will be described.

A first threshold value Ho1 and a second threshold value Ho2 are threshold values to be compared with the outside air temperature Ho. The first threshold value Ho1 is smaller than the second threshold value Ho2.

A second temperature H2 is a threshold value to be compared with the initial temperature Hb. The second temperature H2 is higher than the first temperature H1 shown in FIG. 3.

A first gradient G1, a second gradient G2 and a third gradient G3 are threshold values to be compared with the temperature gradient G. The first gradient G1 is smaller than the second gradient G2. The third gradient G3 may have a different value from the first gradient G1 and the second gradient G2, or may have the same value as the first gradient G1 or the second gradient G2.

When $Ho<Ho1$, the controller 100 executes the second selection process and selects the fourth conveyance mode. When $Ho1\leq Ho<Ho2$ and $Hb<H2$, the controller 100 executes the first selection process and selects one conveyance mode from the third conveyance mode and the fourth conveyance mode based on the temperature gradient G.

When $Ho1\leq Ho<Ho2$ and $Hb\geq H2$, the controller 100 executes the second selection process and selects the third conveyance mode. When $Ho\geq Ho2$ and $Hb<H2$, the controller 100 executes the first selection process, and selects one conveyance mode from the second conveyance mode, the third conveyance mode, and the fourth conveyance mode, based on the temperature gradient G.

When $Ho\geq Ho2$ and $Hb\geq H2$, the controller 100 executes the second selection process and selects the first conveyance mode. That is, when $Ho\geq Ho2$ and $Hb\geq H2$, the controller 100 selects the first conveyance mode without executing the first selection process.

The controller 100 has a function of, when the initial temperature Hb is lower than a rotation start temperature Hm, performing heating by the heater 72A in a state where the pressure roller 73 is stopped until the detection temperature H becomes higher than or equal to the rotation start temperature Hm, and when the detection temperature H becomes higher than or equal to the rotation start temperature Hm, starting the rotation of the pressure roller 73.

The controller 100 has a function of controlling energization to the heater 72A based on a manipulated variable U including the sum of a proportional term proportional to a deviation $\Delta H$ between the target temperature and the detection temperature H and a derivative term proportional to a derivative D of the deviation $\Delta H$. During the particular period T, the controller 100 calculates the manipulated variable U with the derivative term set to 0.

Specifically, the controller 100 calculates the manipulated variable U by the following equation (1).

$$U=Kp\cdot\Delta H+Kd\cdot D \qquad (1)$$

That is, U equals Kp times $\Delta H$ plus Kd times D. Here, Kp is a proportional gain as a preset fixed value, and is a positive value. Kd is a derivative gain as a preset fixed value, and is a negative value. D is a derivative of the deviation $\Delta H$.

The controller 100 determines a duty ratio, which is an amount of energization per unit time, based on the manipulated variable U, and energizes the heater 72A based on the determined duty ratio. The controller 100 increases the duty ratio as the manipulated variable U becomes larger.

Further, the controller 100 has a function of, when the initial temperature Hb is higher than or equal to a third temperature H3 (threshold temperature) which is higher than the first temperature H1, setting a target temperature Ht used for heating by the heater 72A during the particular period T to a higher temperature than a case where the initial temperature Hb is lower than the third temperature H3. Hereinafter, the target temperature Ht during the particular period T is also referred to as a target temperature Ht for determination.

Specifically, when $Hb<H3$, the controller 100 sets the target temperature Ht for determination to a first target temperature Ht1. When $Hb\geq H3$, the controller 100 sets the target temperature Ht for determination to a second target temperature Ht2 which is higher than the first target temperature Ht1.

In the present embodiment, the magnitude relationship of each temperature threshold value described above is set as follows.

$$Ho1<Ho2<H1\approx Hm<H3<H2<Ht1<Ht2$$

Next, the operation of the controller 100 will be described in detail. Upon receiving the print instruction, the controller 100 executes a heating process shown in FIG. 5.

In the heating process, the controller 100 first starts energizing the heater 72A (S1). After step S1, the controller 100 determines whether the detection temperature H is higher than or equal to the rotation start temperature Hm (S2). The controller 100 repeats the process of step S2 until $H\geq Hm$ is satisfied (No).

In response to determining in step S2 that $H\geq Hm$ is satisfied (Yes), the controller 100 starts the rotation of the pressure roller 73 (S3). After step S3, controller 100 executes a selection process of selecting the conveyance mode (S4). The selection process will be described in detail later.

After selecting the conveyance mode in step S4, the controller 100 controls the energization to the heater 72A based on the fixing target temperature (S5). After step S5, the controller 100 determines whether printing is finished (S6).

In response to determining in step S6 that printing has not been finished (No), the controller 100 returns to the process of step S5. In response to determining in step S6 that printing is finished (Yes), the controller 100 stops energizing the heater 72A and stops the rotation of the pressure roller 73 (S7), and ends this process.

Figure 6:
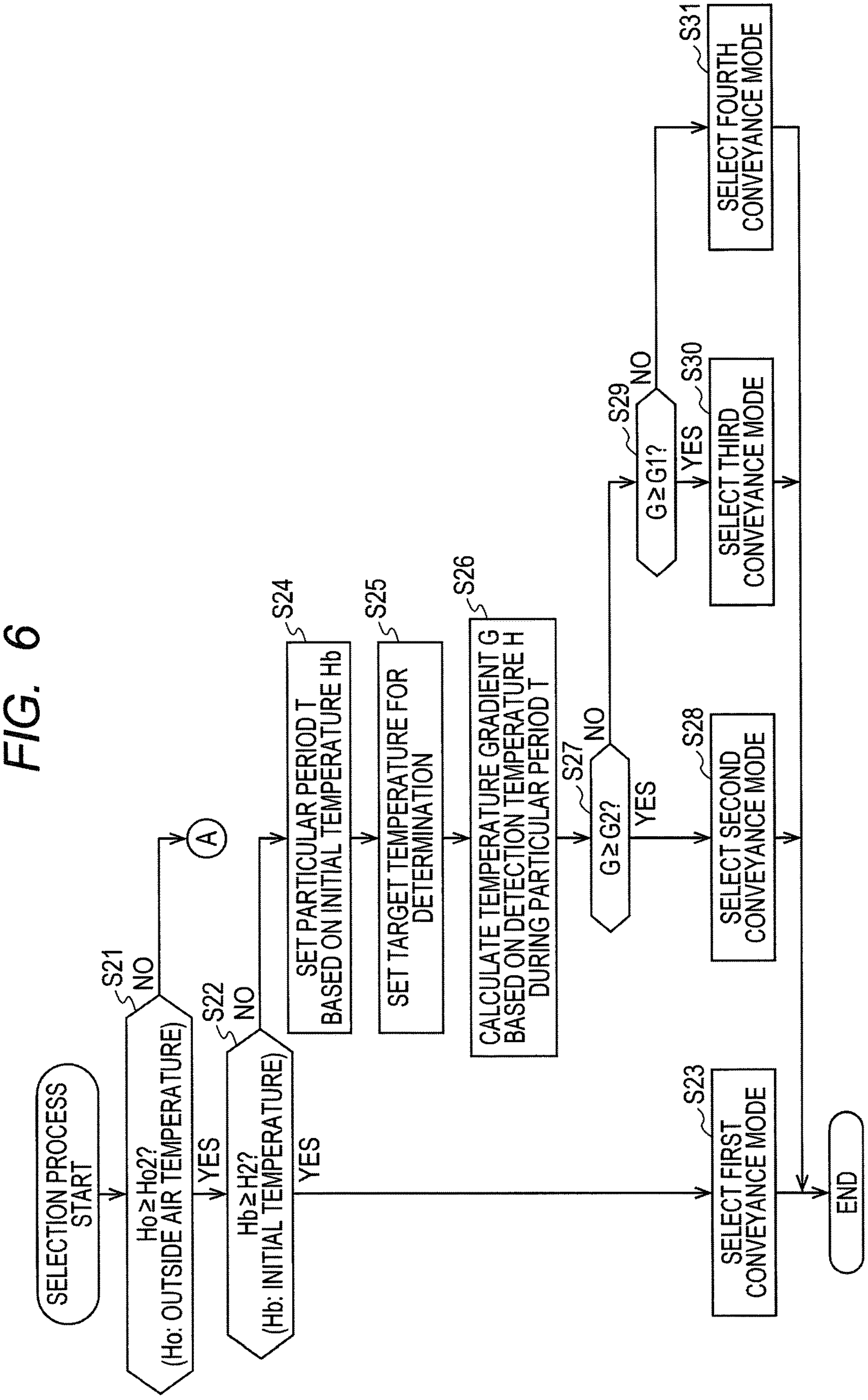
FIG. 6 is a flowchart showing a part of a selection process.

As shown in FIG. 6, in the selection process, the controller 100 first determines whether the outside air temperature Ho is higher than or equal to the second threshold value Ho2 (S21). In response to determining in step S21 that $Ho\geq Ho2$ is satisfied (Yes), the controller 100 determines whether the initial temperature Hb is higher than or equal to the second temperature H2 (S22).

In response to determining in step S22 that the initial temperature Hb is higher than or equal to the second temperature H2 (Yes), the controller 100 selects the first conveyance mode as the conveyance mode (S23), and ends this process. In response to determining in step S22 that $Hb\geq H2$ is not satisfied (No), the controller 100 executes the first selection process (S24 to S31).

In the first selection process, the controller 100 first sets the particular period T based on the initial temperature Hb (S24). Specifically, as shown in FIG. 3, when the initial temperature Hb is lower than the first temperature H1, the controller 100 sets the particular period T to the first period T1. When the initial temperature Hb is higher than or equal to the first temperature H1, the controller 100 sets the particular period T to the second period T2 which is longer than the first period T1.

After step S24, the controller 100 sets the target temperature Ht for determination based on the initial temperature Hb (S25). Specifically, when the initial temperature Hb is lower than the third temperature H3, the controller 100 sets the target temperature Ht for determination to the first target temperature Ht1. When the initial temperature Hb is higher than or equal to the third temperature H3, the controller 100 sets the target temperature Ht for determination to the second target temperature Ht2 which is higher than the first target temperature Ht1.

After step S25, the controller 100 calculates the temperature gradient G based on the detection temperature H during the particular period T (S26). After step S26, the controller 100 determines whether the temperature gradient G is greater than or equal to the second gradient G2 (S27).

In response to determining in step S27 that G≥G2 is satisfied (Yes), the controller 100 selects the second conveyance mode as the conveyance mode (S28), and ends this process. In response to determining in step S27 that G≥G2 is not satisfied (No), the controller 100 determines whether the temperature gradient G is greater than or equal to the first gradient G1 (S29).

In response to determining in step S29 that G≥G1 is satisfied (Yes), the controller 100 selects the third conveyance mode as the conveyance mode (S30), and ends this process. In response to determining in step S29 that G≥G1 is not satisfied (No), the controller 100 selects the fourth conveyance mode as the conveyance mode (S31), and ends this process.

Figure 7:
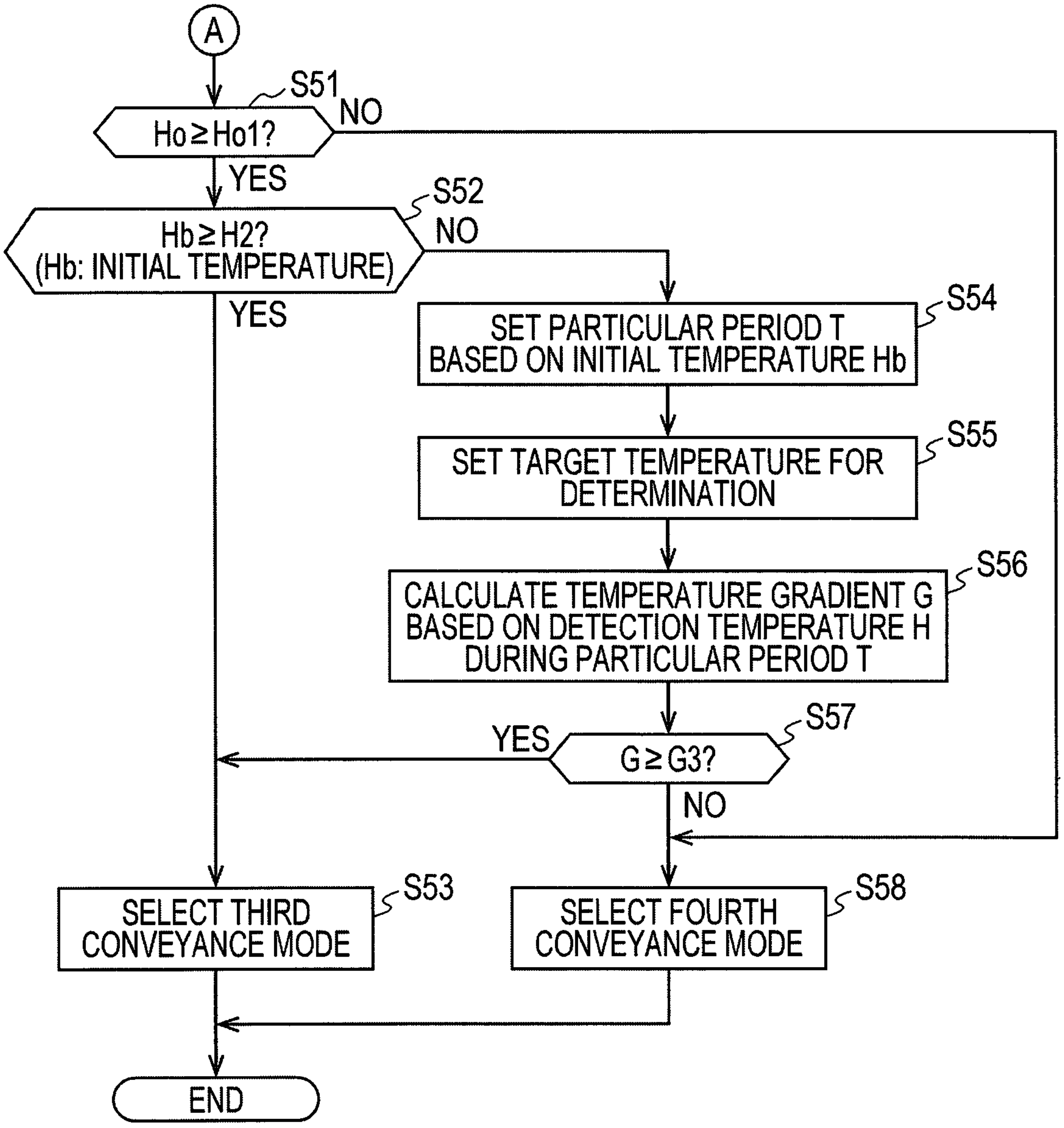
FIG. 7 is a flowchart showing another part of the selection process.

In response to determining in step S21 that Ho≥Ho2 is not satisfied (No), as shown in FIG. 7, the controller 100 determines whether the outside air temperature Ho is higher than or equal to the first threshold value Ho1 (S51). In response to determining in step S51 that Ho≥Ho1 is satisfied (Yes), the controller 100 determines whether the initial temperature Hb is higher than or equal to the second temperature H2 (S52).

In response to determining in step S52 that Hb≥H2 is satisfied (Yes), the controller 100 selects the third conveyance mode as the conveyance mode (S53), and ends this process. In response to determining in step S52 that Hb≥H2 is not satisfied (No), the controller 100 executes the first selection process (S54 to S58, S53).

In the first selection process, the controller 100 first sets the particular period T based on the initial temperature Hb, as in step S24 (S54). After step S54, the controller 100 sets the target temperature Ht for determination based on the initial temperature Hb, as in step S25 (S55).

After step S55, the controller 100 calculates the temperature gradient G based on the detection temperature H during the particular period T, as in step S26 (S56). After step S56, the controller 100 determines whether the temperature gradient G is greater than or equal to the third gradient G3 (S57).

In response to determining in step S57 that G≥G3 is satisfied (Yes), the controller 100 selects the third conveyance mode as the conveyance mode (S53), and ends this process. In response to determining in step S57 that G≥G3 is not satisfied (No), the controller 100 selects the fourth conveyance mode as the conveyance mode (S58), and ends this process.

In response to determining in step S51 that Ho≥Ho1 is not satisfied (No), the controller 100 selects the fourth conveyance mode as the conveyance mode (S58), and ends this process.

Next, an example of the first selection process of the controller 100 will be described.

Figure 8:
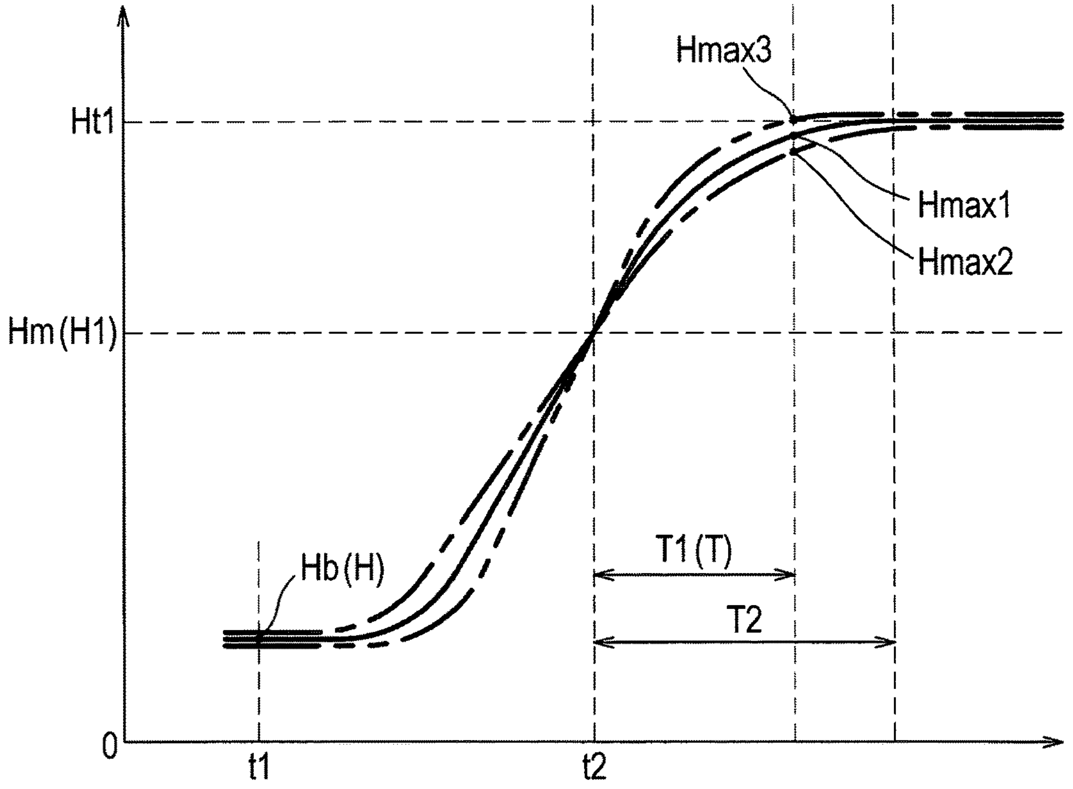
FIG. 8 is a graph showing temperature changes when heating is performed with three types of heaters having different heating capacities when an initial temperature is lower than a first temperature.

As shown by the solid line in FIG. 8, in a case where the initial temperature Hb is lower than the rotation start temperature Hm when the controller 100 receives the print instruction (time t1), the controller 100 starts heating by the heater 72A in a state where the pressure roller 73 is stopped. When the detection temperature H becomes higher than or equal to the rotation start temperature Hm (time t2), the controller 100 starts the rotation of the pressure roller 73 and sets the particular period T to the first period T1 based on the initial temperature Hb. The controller 100 calculates the temperature gradient G based on the detection temperature H during the particular period T, and selects the conveyance mode based on the temperature gradient G.

Figure 9:
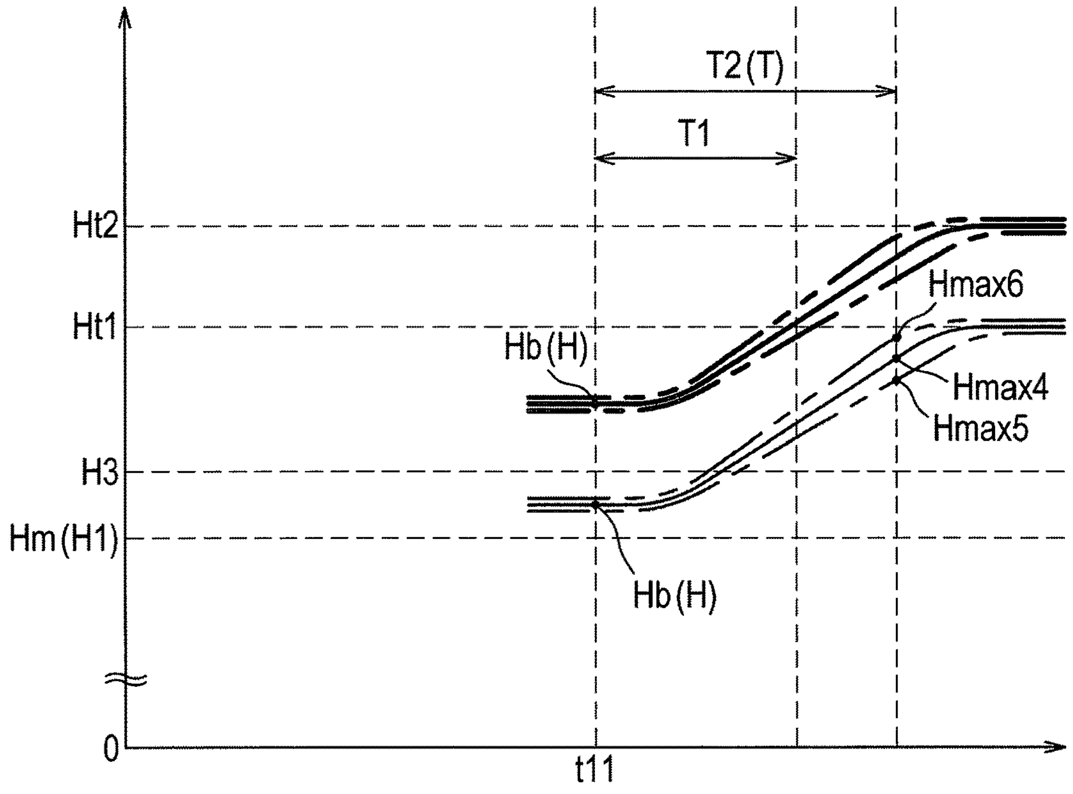
FIG. 9 is a graph showing temperature changes when heating is performed with three types of heaters having different heating capacities when the initial temperature is higher than or equal to the first temperature.

Here, even if the initial temperature Hb is the same, the degree of the temperature rise at the time of starting up the fuser 7 changes depending on the difference in the heating capacity of the heater 72A, the difference in the power supply capacity, the environmental temperature, and so on. FIG. 8 and FIG. 9 described later show, as an example, the difference in temperature change due to the difference in the heating capacity of the heater 72A.

In FIG. 8, the graph shown by the solid line shows a temperature change when heated by the heater 72A having a particular heating capacity. The graph shown by the single-dot chain line shows a temperature change when heated by the heater 72A having a heating capacity that is lower than the particular heating capacity. The graph shown by the double-dot chain line shows a temperature change when heated by the heater 72A having a heating capacity that is higher than the particular heating capacity.

In FIG. 8, the graphs shown by three types of lines are shown in a state where the time points when the detection temperature H reaches the rotation start temperature Hm coincide with each other. Thus, in the graph shown by the solid line, the time when the print instruction is received is time t1. In the graph shown by the single-dot chain line showing the heater having a lower heating capacity, the time when the print instruction is received is earlier than the time t1. In the graph shown by the double-dot chain line showing the heater having a higher heating capacity, the time when the print instruction is received is later than the time t1.

If the particular period T is set to a relatively long time (for example, second period T2) in the case of Hb<H1, each temperature of the three types of the heaters 72A having different heating capacities reaches temperature near the target temperature Ht after an elapse of the particular period T. Thus, the temperature gradients G during the particular period T for the three types become close values, and it becomes difficult to determine the difference in the heating capacity of the three types of the heaters 72A. In contrast, in the present embodiment, since the first period T1, which is a relatively short time, is set to the particular period T, the temperature gradients G during the particular period T become different values for each of the three types, and the difference in the heating capacity of the heaters 72A of the three types are determined.

Specifically, in the graph of the solid line, the temperature gradient G is a temperature difference "Hmax1−Hm" between the detection temperature H(Hm) at the start of rotation of the pressure roller 73 and a highest temperature Hmax1 of the detection temperature H during the particular period T. In the graph of the single-dot chain line, the temperature gradient G is a temperature difference "Hmax2−Hm" between the detection temperature H(Hm) at the start of rotation of the pressure roller 73 and a highest temperature Hmax2 of the detection temperature H during the particular period T. In the graph of the double-dot chain line, the temperature gradient G is a temperature difference "Hmax3−Hm" between the detection temperature H(≈Hm) at the start of rotation of the pressure roller 73 and a highest temperature Hmax3 of the detection temperature H during the particular period T.

As shown by a thin solid line in FIG. 9, if the initial temperature Hb satisfies Hm(H1)≤Hb<H3 when a print instruction is received (time t11), the controller 100 sets the target temperature Ht to Ht1, starts heating by the heater 72A, and starts the rotation of the pressure roller 73. Further, the controller 100 sets the particular period T to the second period T2 based on the initial temperature Hb. The controller 100 calculates the temperature gradient G based on the detection temperature H during the particular period T, and selects the conveyance mode based on the temperature gradient G.

In FIG. 9, the graph shown by a thin solid line shows a temperature change when heated by the heater 72A having a particular heating capacity. The graph shown by the thin single-dot chain line shows a temperature change when heated with the heater 72A having a lower heating capacity than the particular heating capacity. The graph shown by the thin double-dot chain line shows a temperature change when heated with the heater 72A having a higher heating capacity than the particular heating capacity. In FIG. 9, the time point at which the print instruction is received in each of the graphs shown by the three types of lines is the same time point (time t11).

If the particular period T is set to a relatively short time (for example, first period T1) in the case of Hb≥H1, each temperature of the three types of the heaters 72A having different heating capacities has small temperature differences after an elapse of the particular period T. Thus, the temperature gradients G during the particular period T for the three types become close values, and it becomes difficult to determine the difference in the heating capacity of the three types of the heaters 72A. In contrast, in the present embodiment, since the second period T2, which is a relatively long time, is set to the particular period T, the temperature gradients G during the particular period T become different values for each of the three types, and the difference in the heating capacity of the heaters 72A of the three types are determined.

Specifically, in the graph of the solid line, the temperature gradient G is a temperature difference "Hmax4-Hb" between the detection temperature H(=Hb) at the start of rotation of the pressure roller 73 and a highest temperature Hmax4 of the detection temperature H during the particular period T. In the graph of the single-dot chain line, the temperature gradient G is a temperature difference "Hmax5-Hb" between the detection temperature H(=Hb) at the start of rotation of the pressure roller 73 and a highest temperature Hmax5 of the detection temperature H during the particular period T. In the graph of the double-dot chain line, the temperature gradient G is a temperature difference "Hmax6-Hb" between the detection temperature H(=Hb) at the start of rotation of the pressure roller 73 and a highest temperature Hmax6 of the detection temperature H during the particular period T.

As shown by a thick solid line in FIG. 9, if the initial temperature Hb satisfies Hb≥H3 when a print instruction is received (time t11), the controller 100 sets the target temperature Ht to Ht2, starts heating by the heater 72A, and starts the rotation of the pressure roller 73. Further, the controller 100 sets the particular period T to the second period T2 based on the initial temperature Hb. The controller 100 calculates the temperature gradient G based on the detection temperature H during the particular period T, and selects the conveyance mode based on the temperature gradient G.

Each thick line (solid line, single-dot chain line, double-dot chain line) shows the difference in the heating capacity of the heaters 72A, similar to the above-described thin lines. The temperature shown by each thick line changes in a similar manner to each thin line. Thus, by setting the particular period T to the second period T2 which is a relatively long time, it is possible to determine the difference in the heating capacity of the three types of heaters 72A.

According to the above, the following effects are obtained in the present embodiment.

Since the duration of the particular period T is changed depending on the temperature of the fuser 7 when the print instruction is received, the conveyance mode of the sheet S is appropriately selected.

The first selection process is executed based on the temperature difference between the detection temperature H at the start of rotation of the pressure roller 73 and the highest temperature of the detection temperature H during the particular period T. Thus, for example, compared with the case where determination is made based on a temperature gradient at one time point, the temperature gradient of the fuser 7 during the particular period T is calculated more accurately, and the conveyance mode of the sheet S is appropriately selected.

When the temperature of the fuser 7 is lower than the rotation start temperature Hm, heating is performed by the heater 72A in a state where the pressure roller 73 is stopped. Thus, the fuser 7 stores heat sufficiently, and then the rotation of the pressure roller 73 is started.

When the initial temperature Hb is higher than or equal to the second temperature H2, the fuser 7 already stores sufficient heat, and thus conveyance of the sheet S is started without waiting for an elapse of the particular period T. Thus, the printing efficiency is improved.

Since the manipulated variable U is calculated while setting the derivative term to 0 during the particular period T, the variation in the heating capacity of the heater 72A is correctly evaluated. Thus, the conveyance mode of the sheet S is selected appropriately so as to be adapted to the variation in the heating capacity of the heater 72A.

When the initial temperature Hb is higher than or equal to the third temperature H3, the target temperature Ht is raised. This suppresses a decrease in the output of the heater 72A during the particular period T.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below:

In the above-described embodiment, the heater 72A is controlled based on the manipulated variable U calculated with the derivative term set to 0 during the particular period T, but the present disclosure is not limited to this. For example, the controller may set the duty ratio to 100 percent during the particular period.

In this configuration, the heater is energized with 100 percent duty from the start of rotation of the pressure roller until an elapse of the particular period. With this operation, the variation in the heating capacity of the heater is correctly evaluated, and thus the conveyance mode of the sheet is appropriately selected so as to be adapted to the variation in the heating capacity of the heater.

In the above-described embodiment, the fixing belt 71 is exemplified as the fixing rotator, but the present disclosure is not limited to this. The fixing rotator may be, for example, a heating roller.

In the above-described embodiment, the present disclosure is applied to the laser printer 1, but the present disclosure is not limited to this. The present disclosure may be applied to other image forming apparatuses such as a color printer, a copier, and a multifunction peripheral.

The heater is not limited to a halogen lamp, and may be, for example, a carbon heater. The heater may be a flat plate-shaped heater including a base board and a resistance heating element provided on the base board, the heater being in contact with the inner peripheral surface of the fixing belt 71 to heat the fixing belt 71. Further, a plurality of heaters may be provided.

Each element described in the above-described embodiment and modifications may be arbitrarily combined and carried out.

What is claimed is:

1. An image forming apparatus comprising:
- a sheet tray configured to accommodate a sheet;
- a print engine configured to form a toner image on the sheet;
- a conveyor configured to convey the sheet from the sheet tray toward the print engine;
- a fuser configured to fix the toner image on the sheet, the fuser including a fixing rotator and a heater configured to heat the fixing rotator;
- a temperature sensor configured to detect a temperature of the fuser; and
- a controller configured to perform:
  - starting heating of the fixing rotator by the heater;
  - starting rotation of the fixing rotator;
  - determining whether an initial temperature is higher than or equal to a first temperature, the initial temperature being a detection temperature of the temperature sensor when a print instruction is received;
  - in response to determining that the initial temperature is lower than the first temperature, setting a particular period to a first period;
  - in response to determining that the initial temperature is higher than or equal to the first temperature, setting the particular period to a second period longer than the first period; and
  - selecting one conveyance mode from a plurality of conveyance modes, the plurality of conveyance modes having different timings to start conveyance of the sheet by the conveyor, the selecting one conveyance mode including a first selection process of selecting the one conveyance mode based on a detection temperature of the temperature sensor from a first time point at which the rotation of the fixing rotator is started to a second time point at which the particular period elapses from the first time point,
- wherein the controller is configured to execute the first selection process based on a temperature difference between the detection temperature at the first time point and a highest temperature of the detection temperature during the particular period.

2. The image forming apparatus according to claim 1, wherein the controller is configured to:
- in response to determining that the initial temperature is lower than a rotation start temperature, perform the heating by the heater in a state where the fixing rotator is stopped until the detection temperature becomes higher than or equal to the rotation start temperature; and
- in response to determining that the detection temperature is higher than or equal to the rotation start temperature, start the rotation of the fixing rotator.

3. The image forming apparatus according to claim 1, wherein the selecting one conveyance mode further includes a second selection process of selecting the one conveyance mode without using the detection temperature during the particular period;
- wherein the plurality of conveyance modes includes a first conveyance mode, the first conveyance mode being a mode of, after starting the rotation of the fixing rotator in response to the print instruction, starting conveyance of the sheet by the conveyor without waiting for an elapse of the particular period; and
- wherein the controller is configured to:
  - in response to determining that the initial temperature is higher than or equal to a second temperature higher than the first temperature, select the first conveyance mode by executing the second selection process; and
  - in response to determining that the initial temperature is lower than the second temperature, select the one conveyance mode by executing the first selection process.

4. The image forming apparatus according to claim 1, wherein the controller is configured to:
- control energization to the heater based on a manipulated variable including a sum of a proportional term and a derivative term, the proportional term being proportional to a deviation between a target temperature and the detection temperature, the derivative term being proportional to a derivative of the deviation; and
- during the particular period, calculate the manipulated variable in a state where the derivative term is set to zero.

5. The image forming apparatus according to claim 1, wherein the controller is configured to:
- control energization to the heater based on a duty ratio, the duty ratio indicating an amount of energization per unit time; and
- set the duty ratio to 100 percent during the particular period.

6. The image forming apparatus according to claim 1, wherein the controller is configured to:
- in response to determining that the initial temperature is higher than or equal to a threshold temperature, set a target temperature of heating by the heater to a higher temperature than the target temperature in a case where the initial temperature is lower than the threshold temperature, the threshold temperature being higher than the first temperature.

7. The image forming apparatus according to claim 1, further comprising:
- a main housing; and
- an outside air temperature sensor configured to detect an outside air temperature that is a temperature outside the main housing,
- wherein the plurality of conveyance modes includes:
  - a first conveyance mode of, after starting the rotation of the fixing rotator in response to the print instruction, starting conveyance of the sheet by the conveyor at a first timing without waiting for an elapse of the particular period;

a second conveyance mode of starting conveyance of the sheet at a second timing before the detection temperature reaches a fixing target temperature suitable for fixing, the second timing being later than the first timing;

a third conveyance mode of starting conveyance of the sheet at a third timing when the detection temperature reaches the fixing target temperature, the third timing being later than the second timing; and a fourth conveyance mode in which a conveyance speed of the sheet is slower than the conveyance speed in the first conveyance mode, the second conveyance mode, and the third conveyance mode and in which timing of starting the conveyance of the sheet is same as the third timing; and wherein the controller is configured to select the one conveyance mode from the plurality of conveyance modes based on the outside air temperature, the initial temperature, and the detection temperature during the particular period.

8. The image forming apparatus according to claim 7, wherein the selecting one conveyance mode further includes a second selection process of selecting the one conveyance mode without using the detection temperature during the particular period; and wherein the controller is configured to:

in response to determining that the outside air temperature is lower than a first threshold value, execute the second selection process and select the fourth conveyance mode.

9. The image forming apparatus according to claim 7, wherein the selecting one conveyance mode further includes a second selection process of selecting the one conveyance mode without using the detection temperature during the particular period; and wherein the controller is configured to:

in response to determining that the outside air temperature is higher than or equal to a first threshold value and lower than a second threshold value and that the initial temperature is lower than a second temperature higher than the first temperature, execute the first selection process and select the one conveyance mode from the third conveyance mode and the fourth conveyance mode; and in response to determining that the outside air temperature is higher than or equal to the first threshold value and lower than the second threshold value and that the initial temperature is higher than or equal to the second temperature, execute the second selection process and select the third conveyance mode.

10. The image forming apparatus according to claim 7, wherein the selecting one conveyance mode further includes a second selection process of selecting the one conveyance mode without using the detection temperature during the particular period; and wherein the controller is configured to:

in response to determining that the outside air temperature is higher than or equal to a second threshold value and that the initial temperature is lower than a second temperature higher than the first temperature, execute the first selection process and select the one conveyance mode from the second conveyance mode, the third conveyance mode, and the fourth conveyance mode; and in response to determining that the outside air temperature is higher than or equal to the second threshold value and that the initial temperature is higher than or equal to the second temperature, execute the second selection process and select the first conveyance mode.

11. The image forming apparatus according to claim 1, wherein the controller is configured to:

in response to determining that the initial temperature is lower than a rotation start temperature, the rotation start temperature being same as the first temperature:

start the heating by the heater in a state where the fixing rotator is stopped, a target temperature of the heating being set to a first target temperature;

in response to determining that the detection temperature becomes higher than or equal to the rotation start temperature, start the rotation of the fixing rotator; and select the one conveyance mode based on a temperature difference during the particular period, the particular period being set to the first period;

in response to determining that the initial temperature is higher than or equal to the rotation start temperature and lower than a threshold temperature:

start the heating by the heater and start the rotation of the fixing rotator, the target temperature of the heating being set to the first target temperature; and select the one conveyance mode based on the temperature difference during the particular period, the particular period being set to the second period; and in response to determining that the initial temperature is higher than or equal to the threshold temperature:

start the heating by the heater and start the rotation of the fixing rotator, the target temperature of the heating being set to a second target temperature higher than the first target temperature; and select the one conveyance mode based on the temperature difference during the particular period, the particular period being set to the second period.

12. The image forming apparatus according to claim 1, wherein the controller is configured to, based on the selected one conveyance mode, control the conveyor to convey the sheet from the sheet tray toward the print engine.

13. An image forming apparatus comprising:

a sheet tray configured to accommodate a sheet;

a print engine configured to form a toner image on the sheet;

a conveyor configured to convey the sheet from the sheet tray toward the print engine;

a fuser configured to fix the toner image on the sheet, the fuser including a fixing rotator and a heater configured to heat the fixing rotator;

a temperature sensor configured to detect a temperature of the fuser; and a controller configured to perform:

starting heating of the fixing rotator by the heater;

starting rotation of the fixing rotator;

determining whether an initial temperature is higher than or equal to a first temperature, the initial temperature being a detection temperature of the temperature sensor when a print instruction is received;

in response to determining that the initial temperature is lower than the first temperature, setting a particular period to a first period;

in response to determining that the initial temperature is higher than or equal to the first temperature, setting the particular period to a second period longer than the first period; and selecting one conveyance mode from a plurality of conveyance modes, the plurality of conveyance modes having different timings to start conveyance of the sheet by the conveyor, the selecting one conveyance mode including a first selection process of selecting the one conveyance mode based on a detection temperature of the temperature sensor from a first time point at which the rotation of the fixing rotator is started to a second time point at which the particular period elapses from the first time point, wherein the controller is configured to execute the first selection process based on a temperature difference between a lowest temperature and a highest temperature of the detection temperature during the particular period.

* * * * *